United States Patent [19] [11] 3,838,224

Richards [45] Sept. 24, 1974

[54] ELECTRONIC TELEPHONE TRUNK CIRCUIT

[76] Inventor: Lee Wise Richards, 1N231 Woods Ave., Wheaton, Ill. 60187

[22] Filed: May 17, 1973

[21] Appl. No.: 361,188

[52] U.S. Cl. .......... 179/18 AH
[51] Int. Cl. .......... H04m 7/00, H04q 1/52
[58] Field of Search .......... 179/18 AH

[56] References Cited

UNITED STATES PATENTS

| | | | |
|---|---|---|---|
| 3,623,133 | 11/1971 | Ashby | 307/230 |
| 3,763,321 | 10/1973 | Bergquist | 179/18 AH |

*Primary Examiner*—William C. Cooper
*Attorney, Agent, or Firm*—W. H. Kamstra

[57] ABSTRACT

A telephone system outgoing trunk circuit comprising a bridge network connected between the tip and ring conductors to present a bilateral direct current path at the same time presenting a high impedance to alternating current. The common crossarm of the bridge network includes a current limiter circuit, to the operating characteristics of which hysteresis is added by including a voltage opposing the voltage biasing the limiter circuit. The two voltages are provided by capacitors connected in the network conducting paths alternately charged by applied current pulses via transformer windings connected through diodes across the capacitors. Supervision, that is, the detection of the direction of direct current through the network, is accomplished by sensing the relative current magnitudes in the transformer primary windings. The trunk circuit provides a high AC impedance and low DC impedance and isolation while eliminating previously required relay contacts and a bulky inductor.

15 Claims, 5 Drawing Figures

ELECTRONIC TELEPHONE TRUNK CIRCUIT

BACKGROUND OF THE INVENTION

This invention relates to telephone switching systems and more particularly to trunk circuits adapted to interconnect subscriber lines between central offices of such systems.

Although electronic circuits have replaced for many functions a large number of metallic contact control arrangements in many telephone switching systems, mechanically operating relays have continued to play an important role in accomplishing various control operations. Factors such as the need for size and cost reduction, life extension, and the adaptability for circuit integration, to name a few, however, also continue to force a diminishing of that role with more and more solid state devices replacing what relays remain. This is also true in connection with supervisory functions generally and with the supervision of central office outgoing trunks in particular. In the past the transition to all electronic circuitry of a trunk circuit has been complicated by the numerous functions it was called upon to perform. Eight possible trunk states, for example, for one prior art telephone system are schematically depicted in *The Bell System Technical Journal* (BSTJ), Vol. 48, No. 8, Oct. 1969, at page 2701. In more recent known systems these supervisory functions have been reducible simply to the idle state and the seized state, thereby substantially simplifying the trunk circuitry. This simplification renders especially attractive the complete elimination of circuit control via relay contacts in an outgoing section of interoffice trunk and it is to this end that this invention is directed.

A typical prior art central office outgoing trunk employs for supervision purposes direct current supplied by the battery from the distant office via a connecting trunk incoming to the latter. This distant office may in many cases be a considerable distance from the outgoing trunk office. As a result, high longitudinal voltages may be present on the tip and ring conductors of the outgoing trunk. Additionally, differences in earth potential may exist between the two central offices. To prevent these conditions from interfering with calls established between the two offices, direct current isolation is maintained by a normally open relay contact at the outgoing office, which relay contact is closed to seize the trunk. The operational state of the distant incoming trunk is detected by determining the direction of current in the tip and ring conductors of the outgoing trunk. When the called subscriber at the distant office served by the incoming trunk there goes "off-hook," the tip and ring connections at that point are reversed, as is known, to change the direction of the direct current on the outgoing trunk. This current direction may conveniently be detected by known ferrod scanner circuitry. A large inductor is serially associated with the current direction detection circuits to present a high alternating current impedance to alternating current signals on the trunk.

To duplicate the functions of such previous inductor-relay outgoing trunk circuits, an all electronic circuit must thus provide a bilateral direct current path across the tip and ring conductors while presenting in this path a high impedance to alternating current signals. Additionally, it must be isolated with respect to direct voltages from the local office battery and, finally, must be able to detect direct current polarity reversals. It is thus an object of this invention to overcome the problems encountered in providing electronic circuitry for accomplishing these functions. One such problem concerns the provision of the high alternating current impedance in the direct current control path of the trunk circuit. The elimination of the previously employed large inductor for this purpose and its replacement with a conventional electronic alternating current limiter circuit has in the past faced a serious reduction in the range to which the trunk may be extended. A typical current limiter circuit presents a high alternating current impedance only at a minimum applied voltage which may range from a fraction of a volt to several volts. In addition, in order to make use of the high impedance to prevent alternating current loading, a bias voltage must be maintained sufficiently high so that the largest alternating current signal to be passed will not be clipped. For example, if a 5 volt peak alternating current signal is to be passed without clipping and the current limiter limiting voltage is 3 volts, then a minimum bias voltage of 8 volts must be maintained. This means that the range of the trunk circuit would be limited to a loop resistance which at low central office battery voltage, typically negative 42.7 volts, would result in an outgoing trunk tip-to-ring voltage of 8 volts. Since in prior art inductor-relay trunks the inductor needs no bias to present its assigned impedance, these trunks had no such range limitation. One specific object of this invention is thus to remove the range limitation of an electronic trunk circuit by eliminating the trunk tip-to-ring biasing plus limiting voltage requirement of the associated current limiter circuit.

SUMMARY OF THE INVENTION

The foregoing and other objects of this invention are realized in one illustrative trunk circuit in which the alternating current impedance thereacross is provided by a current limiter circuit presenting hysteresis in its operating characteristics. Briefly, a voltage source is connected in series with the current limiter to shift its characteristic curve to a point at which the outgoing trunk could be extended to a range where the tip-to-ring voltage after seizure is zero volts and still present a high impedance to a peak alternating current signal. The current limiter path is rendered bilateral by means of a bridge network including therein PNPN transistors. The latter actually introduce the hysteresis as a result of the potential difference between their activating voltage point and deactivating point. As a result of this shift of operating point, although voltage swings across the tip and ring conductors will remain substantially unchanged, current swings through the current limiter will be virtually eliminated thereby realizing the desired impedance. The effective opposing battery (which compensates for the limiting voltage and voltage peak) is achieved by charging a pair of capacitors connected respectively through diodes across a pair of secondary windings of a relatively small direct current isolation transformer. The capacitors are individually charged to a voltage determined by a pair of primary windings coupled to the secondary wingings, which primary windings are connected to control circuitry which also accomplishes direct current isolation for the trunk circuit. As will be considered in greater detail hereinafter, the aforeoutlined impedance arrangement advantageously lends itself to circuit integration and conveniently eliminates the necessity for the large and bulky inductor previously required for this purpose.

Direct current isolation and control of the outgoing trunk of this invention is accomplished by a two-branched circuit coupled to the aforementioned primary windings, respectively, each branch being alternately driven by a direct current pulse generator. Whichever of the capacitors is more heavily loaded as determined by the direction of supervisory current in the trunk circuit will in turn determine which of the two control circuit branches conducts the least current. This current difference is detected to determine whether or not the distant incoming trunk has reversed its tip and ring contacts, that is, whether the called subscriber is on- or off-hook. Seizure of the outgoing trunk circuit is accomplished by switching on the direct current pulse generator. The manner of trunk seizure and the control of the direct current path across the trunk makes possible a second function without the necessity of providing additional circuitry—the transmission of dial pulses to a distant office.

In the past, in loop pulsing as contrasted with battery and ground pulsing, the distant office incoming trunk battery is employed and dial pulses are transmitted by appropriately breaking and making the trunk tip and ring current. This method has, in the past, encountered the problem of increasing loop resistance. When a relay is employed to receive the dial pulses as is the case in a step-by-step telephone office, for example, the contact release time decreases and the contact operate time increases as the loop resistance increases. This difference between operate and release times alters the per cent break of the dial pulse train and, as a result, limits loop length. In battery and ground pulsing, the incoming trunk battery and the outgoing trunk battery at the calling office are connected in series aiding. By giving the circuit a short loop state and a long loop state, substantially less variation in operate and release times of the incoming trunk dial pulse sensing relay is accordingly encountered and for this reason this method of pulsing has been favored. In an electronic outgoing trunk circuit in accordance with the principles of this invention, the operate and release time of the sensing relay are not as sensitive to loop length since the trunk tip and ring current is regulated by the current limiter circuit connected across it as mentioned in the foregoing. Accordingly, it is an important feature of this invention that an electronic trunk circuit, by controlling its seizure, also can be employed as a dial pulse transmitter. As a result, call procedure is advantageously simplified since it is now unnecessary to connect to a two-state dial pulse transmitting circuit. Operate and release times of the pulse sensing relay are thus minimized.

An all electronic outgoing trunk circuit according to this invention thus advantageously overcomes the dual problems of trunk range limitation previously resulting from the voltage demands of the alternating current impedance circuit and of transmitting dial pulses without the necessity of supplying additional circuitry for this purpose.

BRIEF DESCRIPTION OF THE DRAWING

The objects and features of this invention will be better understood from a consideration of the detailed description of the organization and operation of one illustrative embodiment thereof which follows when taken in conjunction with the accompanying drawing in which.

DETAILED DESCRIPTION—PRIOR ART

Figure 1:
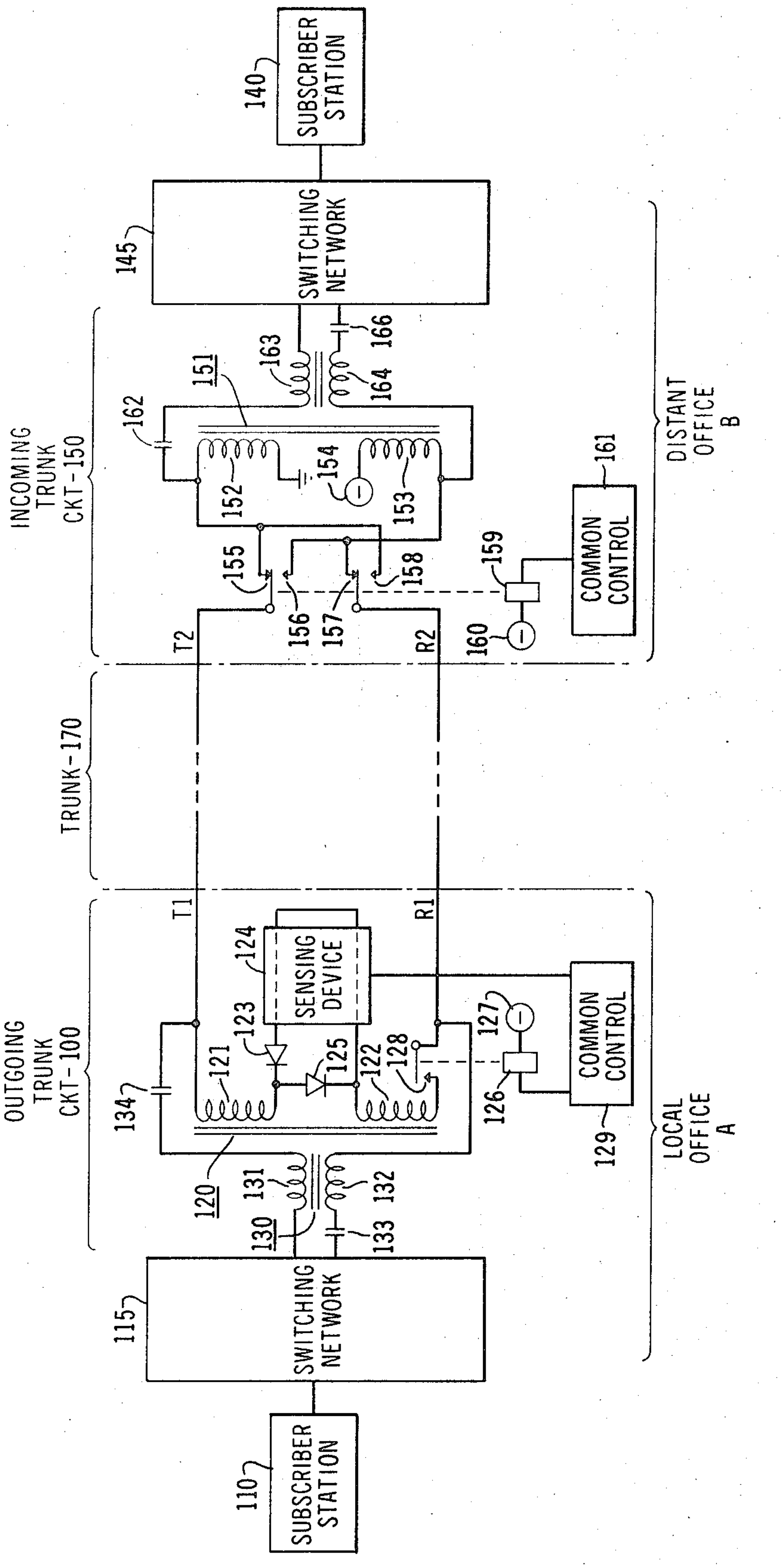
FIG. 1 PRIOR ART
FIG. 1 depicts in schematic form, the purposes of demonstrating the functions of this invention, a typical prior art trunking arrangement interconnecting two telephone central offices.

In order to better understand the organization and operation of an illustrative trunk circuit according to this invention, a typical prior art arrangement will be briefly reviewed with particular reference to FIG. 1. In that figure are shown circuitry of a local telephone central office A, including an outgoing trunk circuit 100, and circuitry of a distant telephone central office B, including an incoming trunk circuit 150, interconnected by a trunk 170. For purposes of description it will be assumed that a call is being originated at subscriber station 110 served by the local office A and that a switching network 115 has connected therethrough a transmission path to outgoing trunk circuit 100. At the distant office B it will be assumed that the incoming trunk circuit 150, connected to the local office A by means of trunk 170, will untimately be connected to a called subscriber station 140 by means of a switching network or other line extending circuitry 145. The circuitry so far referred to and the manner in which the connections are established are well known in the art and need not be further detailed at this point. The outgoing trunk circuit 100 at office A comprises a tip and ring conductor T1 and R1 terminating respectively in one end of windings 121 and 122 of an inductor 120. The other end of winding 121 is connected to the other end of winding 122 through a diode 123 and a current direction sensing device 124. The latter may, in particular applications, comprise a ferrod sensor of the character described in the BSTJ article cited hereinbefore. A second diode 125 is connected across the ends of windings 121 and 122. The trunk circuit 100 is seized by means of a relay 126 connected to a source of potential 127 such as the office battery of office A under the control of instructions from the common control 129 of the telephone system of the local office A. Normally open relay contacts 128 associated with relay 126 serve when closed to complete a direct current supervisory path through the outgoing trunk circuit 100, the other elements of which path have already been noted.

The alternating current path for voice, tones, an multifrequency signals of outgoing trunk circuit 100 continues beyond inductor 120 to the network 115 via the windings 131 and 132 of a second inductor 130 and a capacitor 133. A second capacitor 134 is connected in the tip conductor to one end of winding 131. In the afore-traced direct and alternating current paths, the inductance of inductor 120 is sufficiently high to prevent loading of these alternating current signals while its direct current resistance is sufficiently low to avoid limiting the range of the circuit. In the distant office B the incoming trunk circuit 150 is somewhat similarly organized in that tip and ring conductors T2 and R2 terminate respectively in one end of windings 152 and 153 of an inductor 151. The other ends of windings 152 and 153 are connected respectively to ground and a source of potential 154 which may comprise the office battery of office B. The direct current supervisory path thus presented is controlled by a plurality of relay contacts 155 through 158 which are operated under the control of a relay 159 to reverse the tip and ring connections of incoming trunk circuit 150. The relay 159 is connected to a source of potential 160 and is operated under the control of instructions originating at the common control or other line extending circuitry 161 of the telephone system of central office B. The alternating current path of incoming trunk circuit 150 continues beyond inductor 151 to the network 145 via a capacitor 162 in the tip conductor T2, the windings 163 and 164 of a second inductor 165, and a second capacitor 166 in the ring conductor R2. The latter elements perform the same functions as those described for the corresponding elements of outgoing trunk circuit 100.

The outgoing trunk circuit 100 of office A and the incoming trunk circuit 150 of office B are interconnected by trunk 170 as mentioned hereinbefore. Because the trunk 170 may be of considerable length, high longitudinal voltages may be present on the tip and ring conductors T1 and R1 at the outgoing trunk circuit 100. Differences in ground potential may also exist between offices A and B. Relay 126 provides the necessary DC isolation between its contacts which are connected to office B and its coil which is connected to office A. Outgoing trunk circuit 100 is seized by operation of the latter relay to close its contacts 128. At this time relay 159 of incoming trunk circuit 150 is in the released state and its contacts 155 through 158 maintain the tip and ring conductors in their normal connections to the corresponding conductors of trunk 170. Outgoing trunk circuit 100 is, as a result, connected via trunk 170 to the office battery 154 of incoming trunk circuit 150 and a direct current is established in a circuit which may be traced as follows beginning at ground at one end of winding 152; winding 152, relay contact 155, tip conductor T2, trunk 170, tip conductor T1 at outgoing trunk circuit 100, winding 121, diode 125, winding 122, relay contact 128, ring conductor R1, trunk 170, ring conductor R2, as the circuit returns to incoming trunk circuit 150, relay contact 157, winding 153, and potential source 154. This normal polarity of the supervisory current with respect to ground causes the direct current to be diverted from the sending device 124 via the diode 125 which diversion is sensed when the device 124 is scanned under control of the common control 129 as is well known in the art. Direct current blocking capacitors 134, 133, 166, and 162 prevent the supervisory current from appearing in the alternating paths at the trunk circuits 100 and 150. The information of the current direction obtained from sensing device 124 and the fact that the outgoing trunk circuit 100 is seized apprises the common control 129 of the system that the called subscriber station 140 of distant office B is "on-hook."

When the called subscriber station 140 goes to its "off-hook" state, the common control or other circuitry 161 of office B operates relay 159 to break contacts 155 and 157 and make contacts 156 and 158 to reverse the tip and ring connections between the offices A and B in the supervisory loop circuit traces in the foregoing. As a result, the direct current polarity is reversed with respect to the polarities of the diodes 123 and 125 at outgoing trunk circuit 100, diode 125 at this time blocking the bypass of sensing device 124. As the current now is conducted through device 124, this condition is transmitted to common control 129 to indicate that the called subscriber station 140 has gone to its "off-hook" state. At this time the functions of a prior art outgoing trunk circuit with which this invention is concerned are completed although it may be added that at the completion of the call when relay 159 at the incoming trunk circuit 150 restores its contacts, this fact may also be detected by the reverting of the current to its normal direction and the resultant diversion of current from the sensing device 124. The foregoing review of prior art telephone central office interconnections with specific reference to particular functions of an outgoing trunk circuit will serve to demonstrate the role of improved trunk circuit of this invention. As will appear from the detailed description which follows, an outgoing trunk circuit according to this invention performs the same functions, advantageously without relay 126 and its contacts 128 and without the large inductor 120.

DETAILED DESCRIPTION OF THE INVENTION

Figure 2:
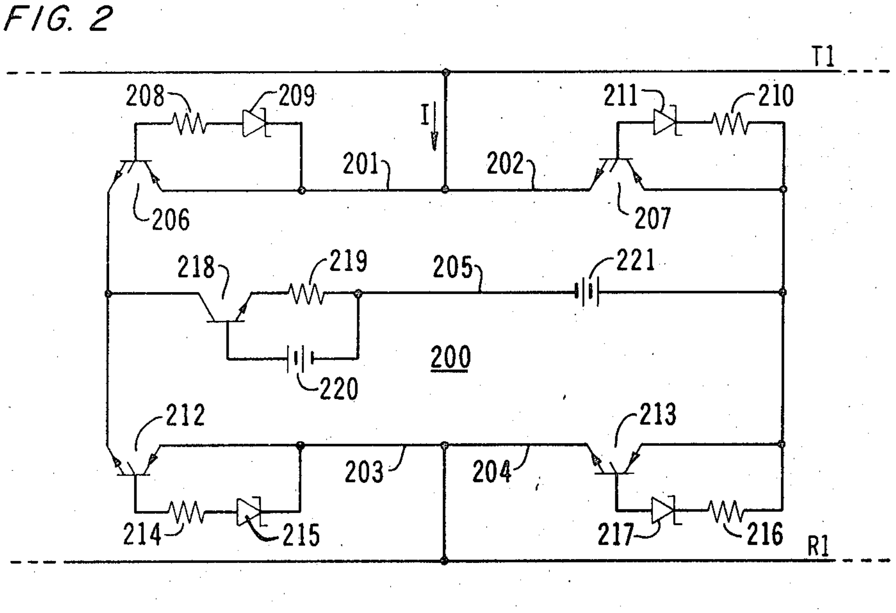
FIG. 2 depicts in schematic form one circuit aspect of an illustrative outgoing trunk circuit of this invention, simplified in order to point out a specific problem encountered and the manner in which the problem is overcome.

A description of one aspect of the electronic outgoing trunk circuit, shown considerably simplified in FIG. 2, will air in understanding the novel manner in which a high alternating current impedance is obtained in accordance with the principles of this invention. Instead of terminating its direct current path via tip and ring conductors T1 and R1 in an inductor 120 as does the trunk circuit 100 of FIG. 1, a trunk circuit of this invention has connected across its conductors T1 and R1 a bridge network 200 having a pair of tip arms 201 and 202 and a pair of ring arms 203 and 204 interconnected at common terminations by a crossarm 205. Arms 201 and 202 each has serially included by its anode and cathode a PNPN thyristor 206 and 207, respectively, the gate electrode of thyristor 206 being connected to the tip side of arm 201 by means of a serially connected resistor 208 and a Zener diode 209. The gate electrode of thyristor 207 is connected to the common interconnection of crossarm 205 and ring arm 204 by means of a serially connected resistor 210 and a Zener diode 211. In a similar manner ring arms 203 and 204 each has serially included by its anode and cathode a PNPN thyristor 212 and 213, respectively, the gate electrode of thyristor 212 being connected to the ring side of arm 203 by means of a serially connected resistor 214 and a Zener diode 215. The cathodes of thyristors 206 and 212 are connected together and to the othe end of crossarm 205. The gate electrode of thyristor 213 is connected to the common interconnection of crossarm 205 and ring arm 204 by means of a serially connected resistor 216 and a Zener diode 217. Crossarm 205 comprises the current limiter section of network 200 and includes a current source comprising an NPN transistor 218 having its emitter connected to a resistor 219. The base of transistor 218 is connected to a source of potential 220 the other terminal of which is connected to the other end of resistor 219. Crossarm 205 also includes a second source of potential 221 connected to the other end of resistor 219.

Figure 3:
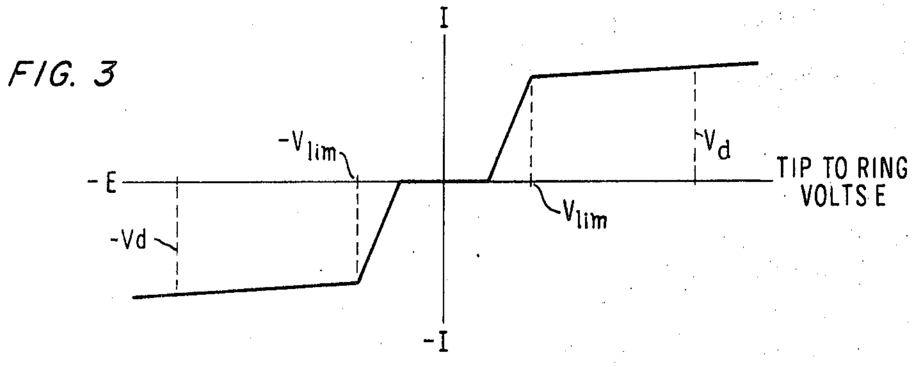
FIGS. 3 and 4 are idealized current-voltage curves supplied as references in connection with the description of the organization and operation of the circuit of FIG. 2.

Typically a current source as described in the foregoing has an operating characteristic which may be graphically demonstrated with particular reference to FIG. 3. A current-voltage curve applicable to the operation of the current limiter circuit of crossarm 205 is there shown modified to take into consideration the effect of the operation of the entire network 200 including the breakdown voltages of the Zener diodes 209, etc., however, assuming that the potential source 221 is momentarily absent from the circuit. In the latter case, during the application of a direct supervisory voltage across the tip and ring conductors T1 and R1 of a polarity to induce a current as indicated by arrow I, the active path through network 200 may be traced as follows from tip conductor T1: arm 201, thyristor 206 controlled by its gate circuit including Zener diode 209, crossarm 205 including resistor 219 and transistor 218 controlled by its base connected to potential source 220, arm 204 including thyristor 213 controlled by its gate circuit including Zener diode 217, to ring conductor R1. As the tip to ring voltage increases no current is present in the network 200 until approximately the sum of the breakdown voltages of diodes 209 and 217 is reached, which sum is indicated on the voltage axis of the graph of FIG. 3 as voltage $V_d$. At this point Zener diodes 209 and 217 are activated, thyristors 206 and 213 are turned on, and the control of the current magnitude is transferred to the current limiter of crossarm 205. At this time the current in crossarm 205 and transistor 218 is limited as determined by the relative values of potential source 220 and emitter resistor 219 unless the tip to ring voltage drops below the limiting voltage point and transistor 218 is driven into saturation. This point is indicated on the voltage axis of the graph of FIG. 3 as point $V_{lim}$. The limiting voltage in this circuit is thus the limiting voltage of transistor 218 plus the forward voltage drop of the two conducting thyristor switches. The current vs. voltage conditions when the applied supervisory current is of the opposite polarity are identical to those just described albeit in the opposite directions as indicated in the graph of FIG. 3.

Figure 4:
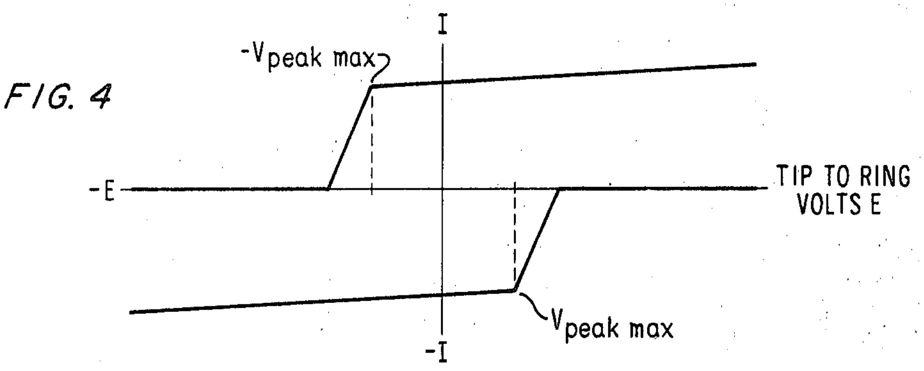

As demonstrated by the relative steepness of the curve prior to and beyond point $V_{lim}$, beyond the latter point current through transistor 218 increases only negligibly as the voltage continues to increase. This condition will continue until transistor 218 reaches breakdown, which point is not shown in FIG. 3. The same condition obtains with respect to an applied voltage of the opposite polarity. Current source transistor 218 thus presents a high impedance to alternating current only if the voltage alternations extend beyond points $V_{lim}$ and $-V_{lim}$. In practical circuits these points may be a fraction of a volt to several volts. In order to prevent any alternating current loading, a bias point must be maintained on the curve sufficiently high so that the largest alternating current signal to be blocked will not extend to the near side of the limiting voltage points and be clipped. This limiting voltage and biasing problem is avoided in accordance with the principles of this invention by introducing hysteresis in the operating characteristics of network 200. This is accomplished in connection with the operational effect of the presence of potential source 221 in the crossarm 205 and will be described with particular reference to the current-voltage graph of FIG. 4.

The potential source 221 is of a polarity which is series aiding to the tip-to-ring biasing voltage and its voltage value is determined as exceeding the transistor 218 limiting voltage by the maximum peak alternating voltage ($V_{peak\ max}$) that the network 200 must pass. The Zener diodes each have a sufficiently high breakdown voltage that the source 221 is prevented from simultaneously turning on all four of the thyristors 206, etc. If the opposing voltage of source 221 is that stated in the foregoing, then the current-voltage curve including the limiting voltage point $V_{lim}$ for a positive applied voltage will be shifted to the left and the limiting voltage is also shifted in that direction to point $-V_{peak\ max}$. Similarly, for a negative applied voltage the shift will occur to the right and the limiting voltage in that case is indicated as point $V_{peak\ max}$ in FIG. 4. The hysteresis thus achieved permits the outgoing trunk circuit of this invention to feed a trunk having a range at which the tip-to-ring voltage after seizure is zero volts and still present a high impedance to the maximum peak alternating current signal.

Figure 5:
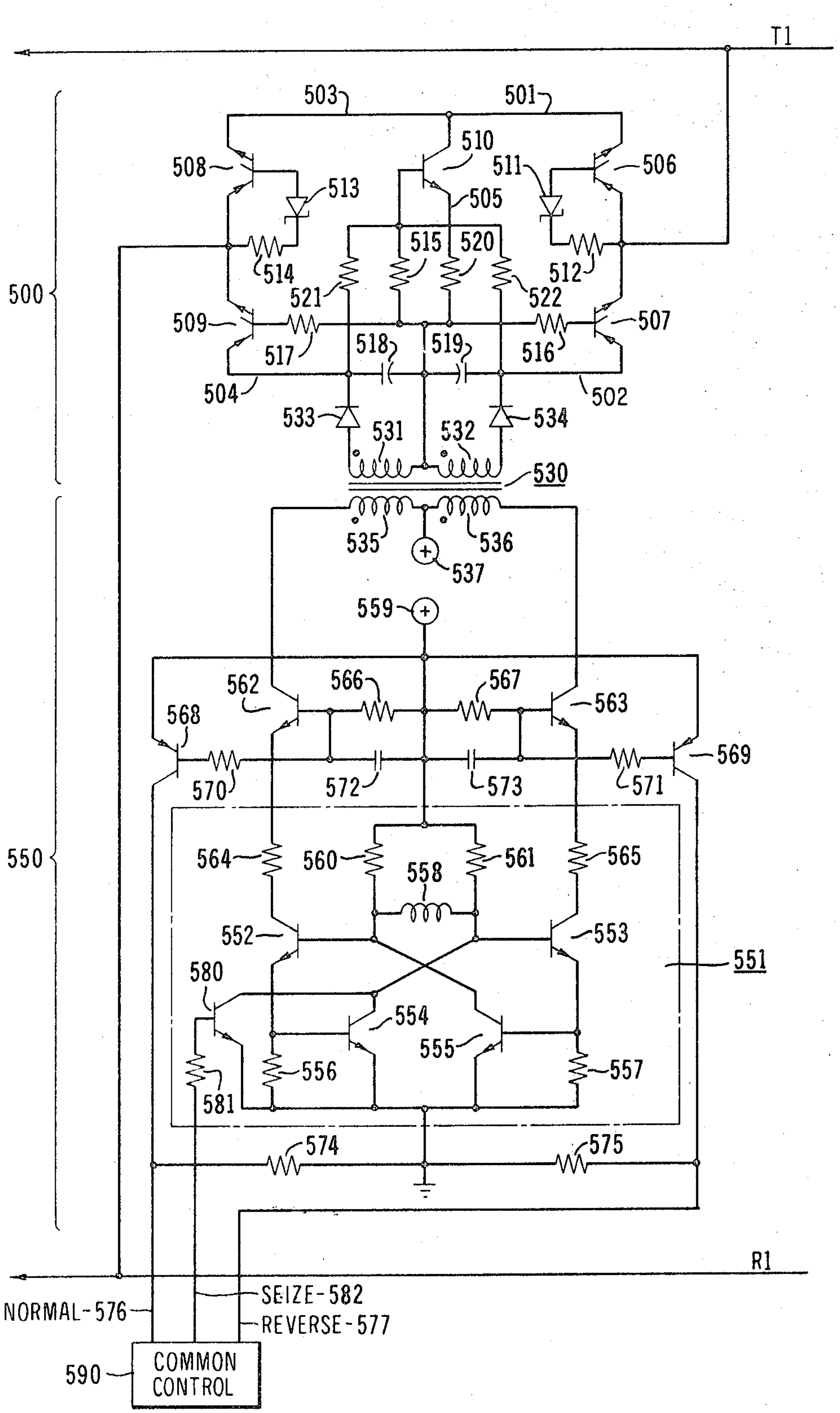
FIG. 5 is a schematic diagram showing in more complete detail the organization of one specific illustrative outgoing trunk circuit according to this invention.

The foregoing description of a simplified trunk circuit to illustrate the principles of this invention will serve as a background for a consideration of the organization and operation of a more completely detailed trunk circuit depicted in FIG. 5. A direct current path between portions of a tip and ring conductor T1 and R1 of an outgoing trunk circuit is there shown conveniently arranged in an impedance bridge network 500 and a control circuit group 550. The alternating current path is not shown but may be assumed as terminating in the manner described in connection with the prior art outgoing trunk circuit 100 of FIG. 1. The bridge network 500 is connected across tip and ring conductors T1 and R1 and comprises a pair of tip arms 501 and 502 and a pair of ring arms 503 and 504 having connected across their interconnections a crossarm 505. The tip and ring arms 501, etc., include, respectively, PNPN thyristors 506 through 509 and crossarm 505 includes an NPN transistor 510 which corresponds to current source transistor 218 of the circuit of FIG. 2. Thyristors 506 and 508 have their gate electrodes connected to control circuits including, respectively, Zener diode 511 and resistor 512 and Zener diode 513 and resistor 514. These circuits control the voltage point at which thyristor 506 and 508 are rendered conductive.

Turn on control of thyristors 507 and 509 in arms 502 and 504, respectively, is accomplished by means of a biasing network interconnecting the gate electrodes of the latter thyristors which network also serves to control the limiting current conducted by current source transistor 510. The base of the latter transistor and the gates of thyristors 507 and 509 are connected to a common point through resistors 515, 516, and 517, respectively, which point is also connected between a pair of capacitors 518 and 519 connected in arms 504 and 502, respectively. Transistor 510 has its emitter connected via a resistor 520 to complete the crossarm 505 in its ultimate connection with the arms 502 and 504 of the bridge network. The trunk circuit arrangement of FIG. 5, instead of providing a single potential source (which series aids the tip-to-ring biasing voltage) in the crossarm of the network as did the simplified circuit of FIG. 2, provides two such sources for purposes which will be considered hereinafter. These sources comprise in part the capacitors 518 and 519, charges on which are applied to the base of transistor 510 via a pair of resistors 521 and 522, respectively, to oppose any voltage appearing across biasing resistor 515. Control of the impedance network 500 is achieved by the control circuits 550 through an isolating transformer 530, split secondary windings 531 and 532 of which have their outer ends connected to the other sides of capacitors 518 and 519 and to resistors 521 and 522 through a pair of diodes 533 and 534, respectively. The other ends of windings 531 and 532 are connected together and to the common point connecting capacitors 518 and 519 with the base of transistor 510.

Control circuits 550 comprise a two branch arrangement controlling impedance network 500 by means of coupled, split primary windings 535 and 536 of transformer 530. The latter windings are connected together at one end and to a source of positive potential 537 which potential may be provided by the local telephone office battery. As will appear hereinafter, the latter battery is, by means of transformer 530, isolated from the distant, called office battery and any potentials which may appear on the connecting trunk. The control circuits 550 are driven by a converter oscillator 551 which in turn is controlled by seizure of the trunk circuit when a call is to be extended through it. Oscillator 551 comprises two pairs of cross-connected NPN transistors 552–553 and 554–555. Transistor 552 having its collector and emitter connected in one of the two aforementioned branches, has its base connected to the collector of transistor 555 which transistor appears in the other of the two branches. Similarly, transistor 553 having its collector and emitter connected in the other of the two branches, has its base connected to the collector of transistor 554 which transistor appears in the first-mentioned of the two branches. The emitters of transistors 552 and 553 and the emitters of transistors 554 and 555 are connected to ground, the former pair through resistors 556 and 557, respectively. The bases of transistors 552 and 553 are connected together through an inductor 558 the ends of which are connected to a source of positive potential 559 through a pair of resistors 560 and 561. The oscillator 551, as will be described hereinafter, supplies alternating nonoverlapping positive pulses to the two circuit branches including the collector-emitter circuits of transistors 552 and 553. These circuits are extended via the collector-emitter circuits of a pair of NPN transistors 562 and 563 and a pair of resistors 564 and 565 to the outer ends of primary transformer windings 535 and 536, respectively. The bases of transistors 562 and 563 are connected to potential source 559 through a pair of resistors 566 and 567, respectively.

Circuitry for detecting the polarity of direct current in the tip and ring conductors T1 and R1 comprises a pair of PNP transistors 568 and 569 associated respectively with the two branches of control circuits 550. The bases of the latter transistors are connected to the bases of transistors 562 and 563 via a pair of resistors 570 and 571, respectively. The common connections of resistor 570 and the base of transistor 562 and resistor 571 and the base of transistor 563 are connected to potential source 559 via a pair of capacitors 572 and 573, respectively, the latter capacitors shunting resistors 566 and 567, respectively. The emitters of transistors 568 and 569 are connected directly to potential source 559, the collectors being connected to ground through a pair of resistors 574 and 575, respectively, and to normal and reverse output conductors 576 and 577, respectively. Finally, the entire outgoing trunk circuit of FIG. 5 is seized in a manner to be described by means of an NPN transistor 580 having its collector connected to the collector of transistor 554 and to the base of transistor 553 and having its emitter connected to ground. Control of seize transistor 580 is effected via a resistor 581 connected to its base which control is extended to the common control 590 of the system with which this invention is advantageously adapted for use by means of a seize conductor 582. Output normal and reverse conductors 576 and 577 are also extended to the latter control for transmitting thereto signals indicative of the operating state of the connecting incoming trunk circuit. The common control circuit 590 may be variously organized depending upon the particular telephone system with which the circuit of FIG. 5 is employed. Since these are well known in the art and since a description of the details of circuit 590 are not essential to an understanding of the organization and operation of this invention, it will be considered only to the extent of specifying the signals originating there and its response to signals transmitted thereto.

With the foregoing description of the organization of one illustrative outgoing trunk circuit according to this invention in mind, typical operations thereof in response to particular telephone system states may now be considered. The circuit of FIG. 5, although initially in its idle state, will be assumed to be connected to a distant office incoming trunk circuit by means of switching network interconnections not shown. As a result, a circuit will be extended to the distant office potential source such as the negative potential source 154 considered in connection with the prior art circuit of FIG. 1, further assuming that the distant subscriber line is "on-hook." At this time, although a circuit is prepared for the application of the distant office battery voltage, no current is present in the outgoing trunk circuit. The latter is seized by applying a ground signal from common control 590 via seize conductor 582 to the base of transistor 580 to turn the latter off. Transistor 580 is normally conducting to maintain the oscillator 551 normally off in a manner to be described. When transistor 580 is turned off oscillator 551 is activated to produce alternating, nonoverlapping current pulses to drive transistors 562 and 563 as follows. Transistor 553 is first rendered conductive because inductor 558 forces the current which had been flowing into the collector of transistor 580 into the base of transistor 553. Transistor 553's emitter current is conducted to ground via resistor 557 and to the base of transistor 555. Its collector current appears as the emitter current of transistor 563. As a result of the potential appearing across resistor 557, transistor 555 is turned on, thereby, as a result of its collector voltage, holding transistor 552 off. Transistor 552 will continue to conduct until the impedance of inductor 558 is sufficiently low to permit the current through resistor 561 to be shunted to ground through conducting transistor 555. At this time transistor 553 beings turning off due to the failure of biasing potential on its base. Transistor 555 remains conductive until conduction of transistor 553 falls to the point where the voltage across resistor 557 is below the emitter base threshold of transistor 555. After the latter transistor turns off, its collector voltage rises to turn on transistor 552 via its collector-base interconnection which in turn renders conductive transistor 554 in the same manner as transistor 555 was rendered conductive by conducting transistor 553. As transistor 554 conducts, its interconnection with the base of transistor 553 holds the latter off. With the conduction of transistor 552, a drive current is applied to the emitter of transistor 562 to complete a first half-cycle of operation. The operation is repeated when transistor 552 is cut off and transistor 553 again conducts to cause a current pulse to drive transistor 563.

The period of oscillation is determined by the resistance values of resistors 560 and 561, the inductance of inductor 558 and the threshold voltages of oscillator 551 transistors. The magnitude of the constant current pulses delivered to transistors 562 and 563 is determined by the resistance values of resistors 564 and 565 and the magnitude of voltage source 559. Advantageously, the pairs of oscillator transistors may be matched by physically fabricating them on the same silicon chip and by employing a single reactive element, the width of the output current pulses may be matched as closely as desired by matching resistors 560 and 561. Nonoverlapping current pulses are ensured because whichever transistor, 552 or 553, is conducting must turn off before its driven transistor, 554 or 555, can turn off and enable the opposite transistor to become conductive. The values of resistors 574 and 575 control to come degree the time interval between output current pulses. A low resistance value of these resistors would allow transistor 554 or 555 to begin turning off sooner and also would reduce the storage time of these transistors since their base drive would be lower. A high resistance value of resistors 574 and 575 would cause transistors 554 and 555 to turn off later, causing their case drives to be higher, with a resultant longer storage time for transistors 554 and 555.

Before seizure of the outgoing trunk circuit, the base of transistor 580 had a normally high potential applied to its base to maintain the transistor normally conductive as previously mentioned. As long as transistor 580 remains conductive current being conducted through parallelly connected resistor 561 and resistor 560-inductor 558 (after the latter has saturated) is shunted to ground. Both transistors 552 and 553 are maintained off as long as transistor 580 remains saturated, with the result that no current is supplied to the emitters of transformer drive transistors 562 and 563. When a ground signal is applied from common control 590 to the base of transistor 580, the latter is turned off and the alternating cycles of operation of oscillator 551 described in the foregoing are begun. The alternating current pulses applied to transistors 562 and 563 appear as collector current in these transistors conducted from potential source 537 via windings 535 and 536, respectively. These pulses are transmitted via secondary windings 531 and 532 and diodes 533 and 534 to charge capacitors 518 and 519, respectively. These charged capacitors advantageously act as and perform the function of the opposing battery 221 of the embodiment of FIG. 2. In addition, they supply the base voltages for current source transistor 510 and thyristors 507 and 509. Two opposing potentials are provided in the embodiment of FIG. 5 in order to provide for direct current polarity detection as will be described hereinafter. Assuming a normal incoming trunk battery potential at the distant office, that is, in specific installations, negative 48 volts applied to the ring conductor, the charges on capacitors 518 and 519 render conductive current source transistor 510 of network 50. Upon the application of the breakdown voltage to Zener diode 511, thyristor 506 and thyristor 509 of arm 504 is turned on and current now appears in the network path which may be traced as follows: from tip conductor T1, anode and cathode circuit of thyristor 506 of arm 501, collector and emitter circuit of transistor 510 of crossarm 505, winding 531 and diode 533, and anode and cathode circuit of thyristor 509 of arm 504, to the ring conductor R1. This current is limited by current source transistor 510.

In the foregoing direct current direction, winding 531 is loaded considerably more than its companion winding 532 with the result that more current is drawn by transistor 563 when it conducts during an applied current pulse than by transistor 562 when it conducts during the other alternating current pulse generated by oscillator 551. Since most of the emitter current supplied to transistor 563 is conducted through its collector, very small base current is drawn. Transistor 562, on the other hand, requires very little collector current due to the loading of windings 535 and 531 of transformer 530 and therefore most of its emitter current is conducted through the base of transistor 562. As a result of this high unbalance in base currents of transistors 562 and 563, sufficient current is conducted through resistor 566 to maintain transistor 568 in saturation since its base is connected to the base of transistor 562. The current conducted through resistor 567 is held well below the level required to turn on transistor 569. The high voltage level across resistor 574 resulting in the collector current of transistor 568 during the seizure of the trunk circuit is transmitted to the common control 590 via normal conductor 576 as an indication that the current direction in the circuit is normal and that the distant subscriber line is "on-hook."

When the distant subscriber line goes "off-hook," the distant negative office battery is transferred from the ring conductor to the tip conductor as described in connection with the prior art arrangement of FIG. 1. At this time the foregoing procedure is repeated except that opposite elements of the trunk circuit are affected. Thus, the current path through network 500 is now traceable as follows, current source transistor 510 remaining conductive by action of the charges on capacitors 518 and 519: from ring conductor R1, thyristor 508 anode and cathode circuit of arm 503, the previously described elements of crossarm 505 including winding 532, diode 534, anode and cathode circuit of thyristor 507 of arm 502, to tip conductor T1. This time it is winding 532 which is the more heavily loaded, with the result that very little collector current is drawn by transistor 563 and most of its emitter current is drawn by its base connected via resistor 571 to the base of transistor 569, which transistor is now driven into saturation. The current through resistor 566 is now below the level required to turn on transistor 568 with the result that its collector current remains low. Conduction of transistor 569 causes its collector to conduct and the voltage across resistor 575 goes to its high state which condition is transmitted to common control 590 via reverse conductor 577 as indicative of the current polarity reversal in the trunk circuit and at the distant office and further indicative that the called subscriber line has gone "off-hook." When the call is completed as indicated by the fact that the called subscriber has reverted to its "on-hook" state, common control 590 idles the outgoing trunk circuit by applying a positive potential to seize conductor 582 which arrests the operation of oscillator 551, thereby permitting capacitors 518 and 519 to discharge and turn current source transistor 510 off. As a result, direct current in the trunk circuit is reduced to zero and the trunk circuit of FIG. 5 is now available for the establishment of another call to a distant office.

In practice it was found that the time required to seize or idle an outgoing trunk circuit of this invention was sufficiently low (on the order of 1 to 2 milliseconds) that it becomes readily adaptable for generating dial pulse signals by appropriately seizing and idling the circuit. Advantageously, limitations encountered in other pulsing arrangements, such as the effect on the length of the pulses of increasing loop resistance, are avoided by the trunk circuit of this invention. Operate and release times of distant office sensing relays, for example, are not as sensitive to loop length when pulsed by the present outgoing trunk circuit. Although some variation in relay operate and release times may exist as a result of cable capacitance, the outgoing trunk circuit current is regulated by the current source transistor 510 of the circuit of FIG. 5.

What have been described in the foregoing are considered to be only illustrative embodiments of outgoing trunk circuits according to this invention. Accordingly, it is to be understood that various and numerous other arrangements may be devised by one skilled in the art without departing from the spirit and scope thereof as defined by the accompanying claims.

What is claimed is:

1. A telephone trunk circuit comprising a tip and ring conductor and a bridge network connected across said conductors, said network presenting a first conducting path for direct current of one polarity and a second conductive path for direct current of the opposite polarity, said first and second paths including a common conducting path comprising a current source circuit means biased by a first voltage source for generating a limited current and means for introducing hysteresis in the operating characteristics of said current source circuit means comprising a second voltage source connected in series opposing with said first voltage source.

2. A telephone trunk circuit as claimed in claim 1 in which said second voltage source comprises a first capacitor associated with one of said first and second conducting paths and first circuit means for periodically charging said first capacitor.

3. A telephone trunk circuit as claimed in claim 2 in which said second voltage source also comprises a second capacitor associated with the other of said first and second conducting paths and second circuit means for periodically charging said second capacitor alternately with said charging of said first capacitor.

4. A telephone trunk circuit as claimed in claim 3 in which said first and second conducting paths each includes a transformer secondary winding connected across said first and second capacitors, respectively, and said first and second circuit means comprise a first and second transformer primary winding coupled to said secondary winding and an oscillator circuit means for alternately applying current pulses to said first and second primary winding.

5. A telephone trunk circuit as claimed in claim 4 also comprising first and second detection circuit means operated responsive respectively to current of a predetermined magnitude in said first or second primary windings for generating a first and a second output signal indicative of the direction of direct current in said bridge network.

6. A telephone trunk circuit as claimed in claim 5 also comprising control circuit means operated responsive to an applied control signal for controlling the activation of said oscillator circuit means.

7. In a telephone trunk circuit including a tip and ring conductor, a direct current path between said tip and ring conductors comprising a bridge network presenting a first conducting path for current in one direction, a second conducting path for current in the opposite direction, said first and second paths including a common conducting path, said common path including a high alternating current impedance circuit comprising a current source being biased by a first voltage source to cause only negligible current change as an applied voltage increases in magnitude after a limiting voltage level and means for introducing hysteresis in the operating characteristic of said current source comprising a second voltage source connected in series opposing said first voltage source.

8. In a telephone trunk circuit including a tip and ring conductor, a direct current path between said tip and ring conductors as claimed in claim 7 in which said first and second conducting paths each includes a first and a second thyristor and a first and a second control circuit for controlling respectively said first and second thyristor, at least one of said control circuits in each of said conducting paths including a Zener diode having a predetermined breakdown voltage point.

9. In a telephone trunk circuit including a tip and ring conductor, the combination as claimed in claim 8 in which said first and second conducting path each includes a transformer secondary winding and in which said first and second voltage source comprises a first and second capacitor connected respectively across said secondary windings, said combination also comprising pulse circuit means including a first and a second transformer primary winding coupled respectively to said secondary windings for applying alternate current pulses thereto for charging said capacitors and circuit means for applying charges on said capacitors in one polarity for biasing said current source and in series opposing said current source in said common conducting path.

10. In a telephone trunk circuit including a tip and ring conductor, the combination as claimed in claim 9 also comprising a first and a second detection circuit means operated responsive to current of a predetermined magnitude in said first or second primary windings of generating output signals indicative of the direction of current in said direct current path.

11. An electrical circuit for presenting a high alternating current impedance between a pair of terminals and a low direct current impedance between said pair of terminals comprising a bridge network comprising a first pair of arms having a common connection at one end with one of said terminals, a second pair of arms having a common connection at one end with the other of said terminals, and a crossarm connecting the other end of one of said first pair of arms and the other end of one of said second pair of arms with the other end of the other of said first pair of arms and the other end of the other of said second pair of arms, said crossarm including a transistor current source having associated therewith a first voltage source means for biasing said source to control its energization whereby an increasing voltage across said pair of terminals causes only a negligible current increase through said network, and means for introducing hysteresis in the operating characteristics of said current source comprising a second voltage source means in series opposing said first voltage source means.

12. An electrical circuit as claimed in claim 11 also comprising means for delaying said energization of said source comprising a PNPN thyristor in each of said arm of said first and second pair of arms and voltage dependent circuit means for controlling the energization of each of said thyristors.

13. An electrical circuit as claimed in claim 12 in which said first and second voltage source means comprise a first capacitor connected in one arm of said first pair of arms, a second capacitor connected in the corresponding arm of said second pair of arms, a transformer having a secondary winding connected in said last-mentioned one arm and a second secondary winding connected in said corresponding arm, said secondary windings being connected respectively across said first and second capacitors, circuit means including a pair of primary windings coupled to said secondary windings for applying alternating current pulses to said last-mentioned windings for charging said capacitors, and circuit means for applying charges on said capacitors to said transistor current source.

14. An electrical circuit as claimed in claim 13 also comprising circuit means operated responsive to current magnitudes in said pair of primary windings for generating output signals indicative of the direction of direct current between said pair of terminals.

15. An electronic telephone trunk circuit including a tip and a ring conductor comprising a bridge network connected across said tip and ring conductor including a first conducting path for current in one direction through said network and a second conducting path for current in the opposite direction through said network, said first and second conducting paths including a common conducting path; PNPN thyristor gating means in each of said first and second conducting paths, each of said gating means being energized only upon the application of a predetermined voltage thereacross, a transistor current source means in said common conducting path, means for biasing said source means to an operating point where an increasing applied voltage is accompanied by only a negligible current increase comprising a first and a second capacitor connected respectively in said first and second conducting paths, a first and a second transformer secondary winding connected respectively across said first and second capacitor, circuit means including a first and a second transformer primary winding coupled respectively to said first and second secondary windings for applying alternating current pulses to said lastmentioned windings for charging said capacitors, and first circuit means for applying charges on said capacitors in one polarity to said current source means; means for introducing hysteresis in the operating characteristics of said current source means comprising second circuit means for applying charges on said capacitors in the opposite polarity in said common conducting path, and circuit means operated responsive to relative current magnitudes in said first and second transformer primary windings for generating individual output signals indicative of the presence of current in said first or second conducting paths.

* * * * *

UNITED STATES PATENT OFFICE
CERTIFICATE OF CORRECTION

Patent No. 3,838,224 Dated September 24, 1974

Inventor(s) Lee Wise Richards

It is certified that error appears in the above-identified patent and that said Letters Patent are hereby corrected as shown below:

Abstract Page:

Column 1, line 4, delete [76] and insert --75--;
line 7, add --[73] Assignee:
Bell Telephone Laboratories,
Incorporated, Murray Hill, N.J.--

Signed and sealed this 31st day of December 1974.

(SEAL)
Attest:

McCOY M. GIBSON JR.
Attesting Officer

C. MARSHALL DANN
Commissioner of Patents